United States Patent
Wolfe et al.

(10) Patent No.: US 6,779,025 B1
(45) Date of Patent: Aug. 17, 2004

(54) IP WEB BASED MESSAGING SYSTEM FOR LOCALIZED MANAGEMENT OF WIRELESS MESSAGING

(75) Inventors: William M. Wolfe, Santa Monica, CA (US); Lewis Dean Dodrill, Richmond, VA (US); Satish Joshi, Glen Allen, VA (US)

(73) Assignee: Cisco Technology, Inc., San Jose, CA (US)

(*) Notice: Subject to any disclaimer, the term of this patent is extended or adjusted under 35 U.S.C. 154(b) by 514 days.

(21) Appl. No.: 09/608,187

(22) Filed: Jun. 30, 2000

(51) Int. Cl.[7] .............................................. G06F 13/00
(52) U.S. Cl. ..................... 709/219; 709/206; 709/225; 709/249
(58) Field of Search ................................ 709/203, 206, 709/217, 219, 223, 225, 229, 249; 719/311, 313, 328

(56) References Cited

U.S. PATENT DOCUMENTS

| | | | |
|---|---|---|---|
| 4,837,798 A | | 6/1989 | Cohen et al. |
| 6,061,432 A | | 5/2000 | Wallace et al. |
| 6,138,158 A | * | 10/2000 | Boyle et al. ............... 709/225 |
| 6,311,194 B1 | * | 10/2001 | Sheth et al. ............... 707/505 |
| 6,385,202 B1 | * | 5/2002 | Katseff et al. ............. 370/401 |
| 6,389,276 B1 | * | 5/2002 | Brilla et al. .............. 455/413 |
| 6,400,940 B1 | * | 6/2002 | Sennett ..................... 455/414 |
| 6,519,246 B1 | * | 2/2003 | Strahs ....................... 370/259 |
| 6,556,997 B1 | * | 4/2003 | Levy ......................... 707/10 |

OTHER PUBLICATIONS

Sims, "Standards Update: The Voice Browser", Oreilly Network, Mar. 11, 2000, 4 pages.
Cox, "Allowing The Web To Be Heard", Network World Fusion, Apr. 24, 2000, 2 pages.

\* cited by examiner

*Primary Examiner*—Viet D. Vu
(74) *Attorney, Agent, or Firm*—Leon R. Turkevich (57) ABSTRACT

An application server, configured for executing a messaging application defined by XML documents, is able to provide messaging services to a calling party for a remote subscriber based on retrieval of subscriber attribute information obtained from a remote information database server (such as LDAP) via an Internet Protocol (IP) network. The application server, upon receiving a voice application operation request having subscriber identifier information from a browser serving the calling party, obtains from the remote information database server attribute information for responding to the voice application operation request based on the subscriber identifier information. The application server generates an HTML document having media content and control tags for personalized execution of the voice application operation based on the attribute information obtained from the standardized database server. The application server also is configured for sending and retrieving messages from a standardized remote messaging server via the IP network.

12 Claims, 5 Drawing Sheets

IP WEB BASED MESSAGING SYSTEM FOR LOCALIZED MANAGEMENT OF WIRELESS MESSAGING

BACKGROUND OF THE INVENTION

1. Field of the Invention

The present invention relates to messaging operations for users of wireless communications systems based on voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides a synchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications (Attorney Docket 95-409), the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Wireless communications systems have been developed with enhanced functionality, relative to conventional landline networks, based on the unique characteristics of wireless communications. In particular, voice messaging becomes an important part of the wireless service offering due to the transient nature of wireless telephone users and the limited access to the wireless telephone. Wireless telephone users often are unavailable, for example when their wireless telephones are turned off to conserve battery power, when they are on an existing wireless telephone call, when they are roaming within an area where they cannot receive incoming calls, or when they are not within a coverage area. Consequently, voice messaging services are essential for wireless users.

A particular problem with messaging for wireless subscribers is the costs associated with accessing the subscriber's voice mail system for storage or retrieval of voice mail messages. In particular, telephony based voice mail systems for wireless subscribers of a prescribed home region typically are deployed coresident with the subscribers' mailbox storage within the home region, requiring the routing of a call to the subscriber's voice mail system location using telephony network facilities. If a subscriber calling into his or her mailbox is not in his or her voice mail system location, the call needs to be routed over a long distance or international long distance facilities back to the subscriber's voice mail location. In addition, callers leaving messages for a wireless subscriber that is not accessible are routed over telephony network facilities to the subscriber voice mail system location.

The routing of these calls presents a substantial traffic dilemma for the wireless service provider. Since wireless subscribers pay for incoming calls on some wireless networks, calls that terminate in a mailbox in response to a detected no answer condition or a busy condition results in additional charges for incoming calls. However, the wireless carrier must incur the additional expense of routing these calls over telephony network facilities.

SUMMARY OF THE INVENTION

There is a need for an arrangement that enables access to voice messaging systems for wireless subscribers to be terminated locally at the nearest wireless point of presence for a calling party accessing the voice messaging system for storage or retrieval of a message.

There is also a need for an arrangement that enables wireless service providers to avoid the costs associated with routing calls destined for a voice messaging system over telephony network facilities, such as interexchange carrier facilities or international facilities.

These and other needs are attained by the present invention, where an application server, configured for executing a messaging application defined by XML documents, is able to provide messaging services to a calling party for a remote subscriber based on retrieval of subscriber attribute information obtained from a remote information database server (such as LDAP) via an Internet Protocol (IP) network. The application server, upon receiving a voice application operation request having subscriber identifier information from a browser serving the calling party, obtains from the remote information database server attribute information for responding to the voice application operation request based on the subscriber identifier information. For example the subscriber identifier information may include a dialed number identification string (DNIS) in the case of a message storage operation for a calling party attempting to reach the subscriber; alternately, the subscriber identifier information may include a subscriber number and password in the case of a roaming subscriber accessing his or her message mailbox. The application server generates an HTML document having media content and control tags for personalized execution of the voice application operation based on the attribute information obtained from the standardized database server. The application server also is configured for sending and retrieving messages from a standardized remote messaging server (such as IMAP) via the IP network based on a destination address specified in the subscriber attribute information. The access of the remote information database server and the standardized remote messaging server via the IP network enables the application server to provide portable application services for roaming subscribers or calling parties. Hence, application infrastructure can be shared among multiple servers to provide portable application servers, eliminating the necessity of routing telephone calls across interexchange carrier facilities or international facilities.

One aspect of the present invention provides a method in an application server for executing a messaging application. The method includes receiving a first HTTP request, from a proxy browser serving a user, for execution of a prescribed messaging application operation related to a specified remote subscriber. Subscriber attribute information is obtained for the specified remote subscriber from an Internet Protocol (IP) based database server configured for storing subscriber attributes for local subscribers and retrieving the subscriber attributes for remote subscribers from remote IP based database servers. A Web page is generated, for execution of the prescribed messaging application operation and having media content and control tags, based on the first HTTP request and the obtained subscriber attribute information. The method also includes accessing via an IP network an IP-based messaging server for at least one of retrieval and storage of subscriber messaging information for the specified remote subscriber, based on a prescribed messaging address retrieved from the obtained subscriber attribute information and a second HTTP request received from the proxy browser and having a reference to the prescribed messaging application operation. Hence, the application server is configured for obtaining via the IP network subscriber attributes and subscriber messaging information, even for remote subscribers having information stored on remote servers. Hence, the application server can provide portable application services for mobile subscribers having devices lacking browser capabilities, eliminating the necessity that a mobile subscriber needs a browser to directly access a given server at the prescribed location.

Another aspect of the present invention provides a method in a wireless communications system of storing a message for a wireless subscriber. The method includes terminating by a mobile switching center an incoming wireless telephone call from a wireless user to a proxy device configured for generating HTTP requests and playback of media content based on selective execution of tagged information within Web pages. The method also includes initiating by the proxy device a messaging application session, related to the wireless subscriber, between the wireless user and an application server configured for generating the Web pages based on the respective HTTP requests, at least one oft he HTTP requests specifying the wireless subscriber. The application server obtains subscriber attribute information related to the wireless subscriber from an Internet Protocol (IP) based database server via an IP network, and the proxy device supplies an HTTP request containing a message from the user to the application server. The application server sends the message via the IP network to an IP-based messaging server for storage based on a prescribed messaging address retrieved from the obtained subscriber attribute information. The retrieval of subscriber attribute information by the application server enables the application server to locate the prescribed messaging address for the wireless subscriber in order to send the message via the IP network, eliminating the necessity for telephony network facilities between the mobile switching center and the wireless subscriber's messaging system. Moreover, the retrieval of subscriber attribute information enables the application server to provide local messaging services for the wireless user via the mobile switching center, with personalized options as specified by the wireless subscriber, for example a personalized prompt.

Still another aspect of the present invention provides a method in a wireless communications system of retrieving a stored message for a roaming wireless subscriber. The method includes terminating by a mobile switching center an incoming wireless telephone call from the roaming wireless subscriber to a proxy device configured for generating HTTP requests and playback of media content based on selective execution of tagged information within Web pages. The method also includes initiating by the proxy device a messaging application session executed by an application server for the roaming wireless subscriber, the application server configured for generating the Web pages based on the respective HTTP requests, at least one of the HTTP requests specifying the wireless subscriber. The application server obtains subscriber attribute information related to the roaming wireless subscriber from an Internet Protocol (IP) based database server via an IP network, and obtains the stored message via the IP network from an IP-based messaging server based on a prescribed address retrieved from the obtained subscriber attribute information. The application server generates a Web page including tags for playback of the stored message to the roaming wireless subscriber by the proxy device. The initiation of a messaging application session with the application server enables the roaming wireless subscriber to access stored messages from remote messaging servers via the IP network, eliminating the necessity of establishing a long distance call between the mobile switching center and the roaming wireless subscriber's message store using telephony circuits. Hence, voice mail services may be provided for roaming wireless subscribers without reliance on telephony network facilities between the mobile switching center and the roaming wireless subscriber's message store.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
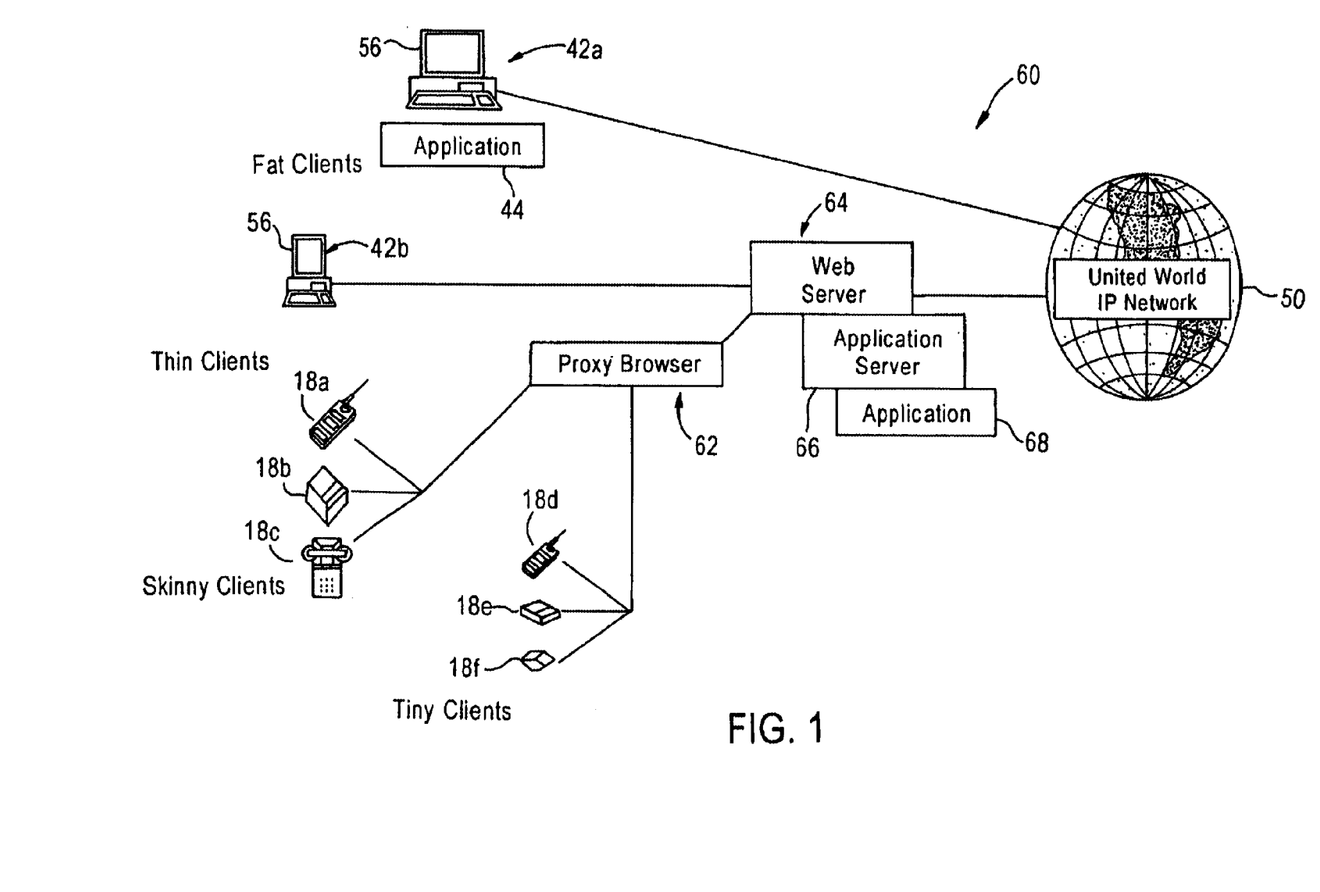
FIG. 1 is a block diagram illustrating an system enabling deployment of a unified messaging system, capable of executing voice enabled web applications, according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 2:
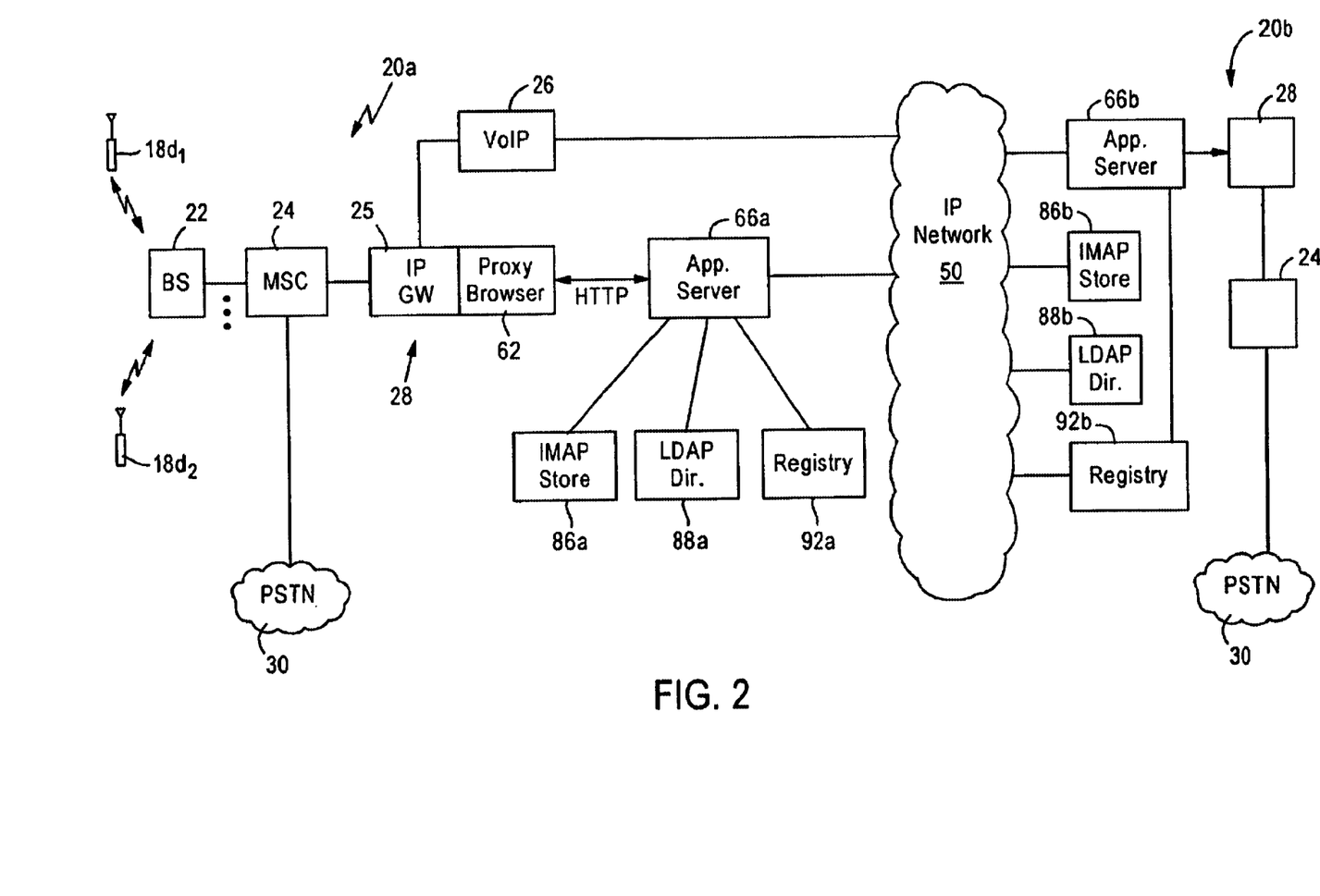
FIG. 2 is a diagram illustrating a wireless communications system utilizing an application server for access of profile information and subscriber messaging information for a remote subscriber from remote databases according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., XML pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating a system for internetwork communications between wireless communications systems using the unified messaging system implemented by the voice application server 66 according to an embodiment of the present invention. The wireless communications system 20a includes a base station 22 configured for wireless communications with the mobile telephone 18d using known wireless protocols, a mobile switching center 24 configured for switching calls, a proxy device 28 having an IP gateway 25 and a proxy browser 62, serving as an IP and HTTP interface for a voice over IP resource 26 and the application server 66a, respectively. The application server 66a is configured for accessing according to IP protocol an IMAP message store (i.e., messaging server) 86a, an LDAP directory (i.e., database server) 88a, and a registry 92a of active users having an ongoing session with the application server 66a, described in further detail with respect to FIG. 3.

Since the application server 66a is configured for accessing the IMAP message store directory 86a, the LDAP directory 88a, and the registry 92a according to IP protocol, the application server 66a is able to access any directory having a valid IP address via the IP network 50, including the directories 86b and 88b associated with the wireless communications system 20b. In particular, the application server 66a can either directly access subscriber profile information from the LDAP directory 88b via the IP network 50, or the application server 66a may send a request to the LDAP directory 88a, relying on the LDAP directory 88a to search and retrieve from the LDAP directory 88b the necessary subscriber profile information for a roaming subscriber.

Hence, assuming a wireless subscriber of the wireless communications system 20b using the mobile telephone $18d_1$ is roaming within the wireless communications system 20a, but has all of his or her subscriber profile information stored in the LDAP directory 86b, the roaming wireless subscriber $18d_1$ can access the local application server 66a for retrieval of messages stored in the IMAP message store 86b, without relying on telephony network facilities within the public switched telephone network 30.

In addition, the access of the LDAP directory 88b and the IMAP message store 86b by the application server 66a enables the application server 66a to initiate a messaging operation, personalized on behalf of the roaming wireless subscriber $18d_1$, for a calling party $18d_2$ attempting to reach the roaming wireless subscriber $18d_1$. In particular, the MSC 24, in response to detecting a determined unavailability of the roaming wireless subscriber $18d_1$, terminates the incoming call from the calling party $18d_2$ to the IP gateway 25, causing the browser 62 to initiate a messaging application session with the application server 66a by sending an HTTP request that includes the dialed number identification string (DNIS) of the roaming wireless subscriber $18d_1$. The application server 66a, in response to receiving the HTTP request including the DNIS of the roaming wireless subscriber $18d_1$, obtains the subscriber profile information from the LDAP directory 88b and possibly a personalized prompt from the IMAP message store 86b, enabling the application server 66a to provide for the calling party $18d_2$ a messaging session on behalf of the roaming wireless subscriber $18d_1$.

Hence, the application server 66a can provide local messaging services for either roaming subscribers $18d_1$, or wireless subscribers $18d_2$ attempting to reach remote wireless subscribers, without the necessity of telephony network facilities of the public switched telephone network 30. Hence, the application server 66a can provide portable application services based on accessing subscriber profile information via the IP network 50.

Figure 3:
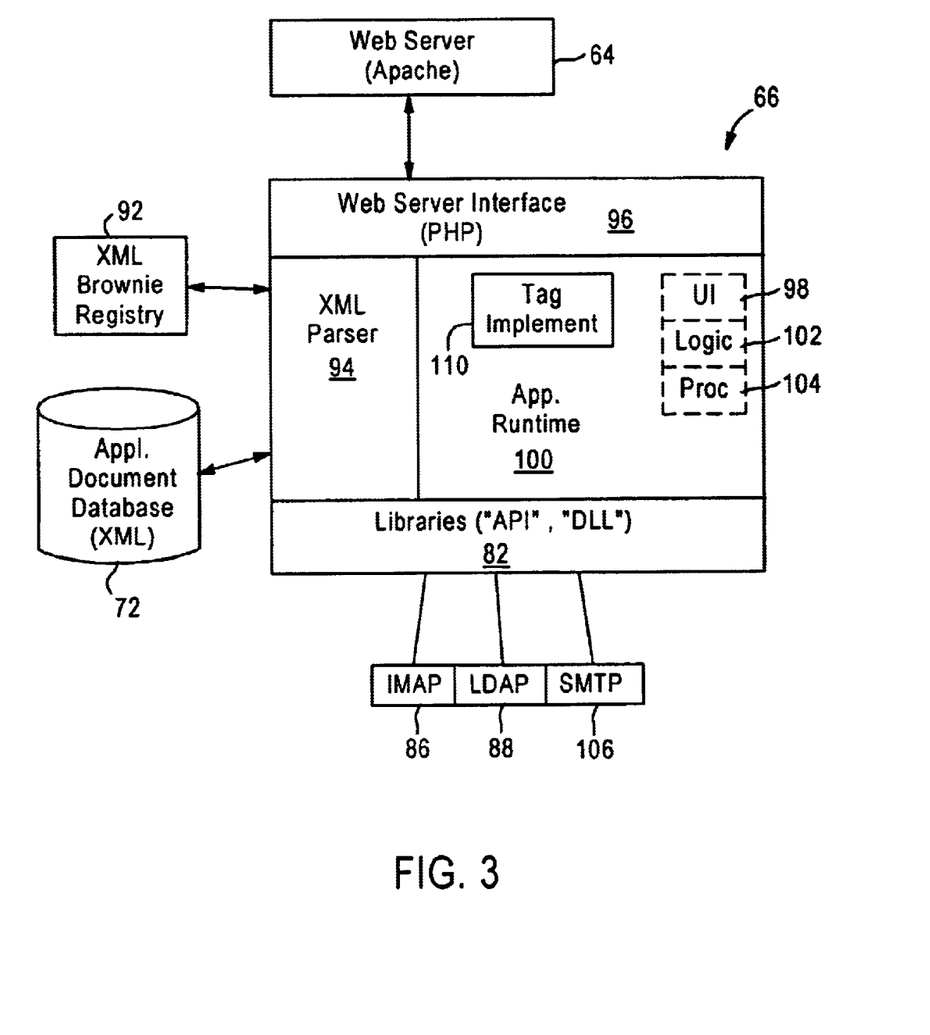
FIG. 3 is a diagram illustrating in detail the application server of FIGS. 1 and 2 according to an embodiment of the present invention.

FIG. 3 is a diagram illustrating in further detail the application server 66. The application server 66 receives via the web server 64 HTTP requests from either a PC-based web browser 42 capable of supplying full media content (e.g., audio, text, images, and streaming video), or a proxy browser 62 configured for serving as an HTTP interface for a user input device, such as a telephone 18, having limited media capabilities (e.g., audio only). In response to receiving the HTTP requests, the voice application server 66 accesses a selected XML document based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document, and dynamically generates an HTML page having XML tags that specify media content (e.g., .wav files) and control information for playing the media files by the corresponding browser.

The voice application server 66 is configured for accessing service application programming interfaces (API's) 82 to external resources based on prescribed procedures that may be called during parsing of an XML tags in a selected XML document. As described below, the application server 66 issues function calls to an API 82 for accessing the external resources for prescribed operations, enabling the deployment of a robust, scalable unified messaging system having messaging operations distributed across multiple platforms. In particular, the application server 66 accesses subscriber profile information from an IP-based database server 84 according to LDAP protocol. As described below, the application server 66 is configured for storing and retrieving messages in a standardized format (e.g., e-mail with binary encoded attachments) in an IMAP messaging server 86. In addition, the application server 66 may issue function calls for a text to speech resource, or an outgoing fax server, in order to deliver different-format messages to users, depending on the capability of the user devices. Hence, the voice application server 66 may access the text to speech resource for converting an e-mail message into a audio-based message to be played for the user of the telephony device 18. Similarly, the voice application server 66 may determine that the proxy browser 62 does not interface with a telephony gateway device having facsimile transmission capabilities, hence the fax message retrieved from the IMAP message store 86 would be sent to the outgoing fax server for retransmission to another telephone number identified as serving a fax machine.

The application server 66 is implemented as a server executing a PHP hypertext processor with XML parsing and processing capabilities, available open source on the Internet at http://www.php.net. As shown in FIG. 3, the server system 66 includes an XML parser 94 configured for parsing the application-defining XML documents stored in the XML document database 72, or the XML documents (i.e., "brownies") stored in the registry 92 and configured for specifying the state and attributes for respective user sessions. As described below with respect to FIGS. 4A and 4B, the application server 66 may store subscriber profile information for roaming subscribers for a minimum prescribed time interval beyond the duration of an individual user session, minimizing the number of times the application server 66 needs to access remote LDAP directories such as the directory 88b of FIG. 2. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. For example, the application server 66 may issue a function call to one of a plurality of IP protocol compliant remote resources 86, 88, or 106 according to IMAP protocol, LDAP Protocol, or SMTP protocol, respectively, described below. For example, the PHP hypertext processor includes executable routines capable of accessing the IMAP or LDAP services. Note that the mechanisms for accessing the services 86, 88, or 106 should be established within the application server before use of XML documents that reference those services. Once the services 86, 88, or 106 are established, the application runtime environment 100 can perform a function operation by using executable functions specified by a function call rule set.

Figure 4A:
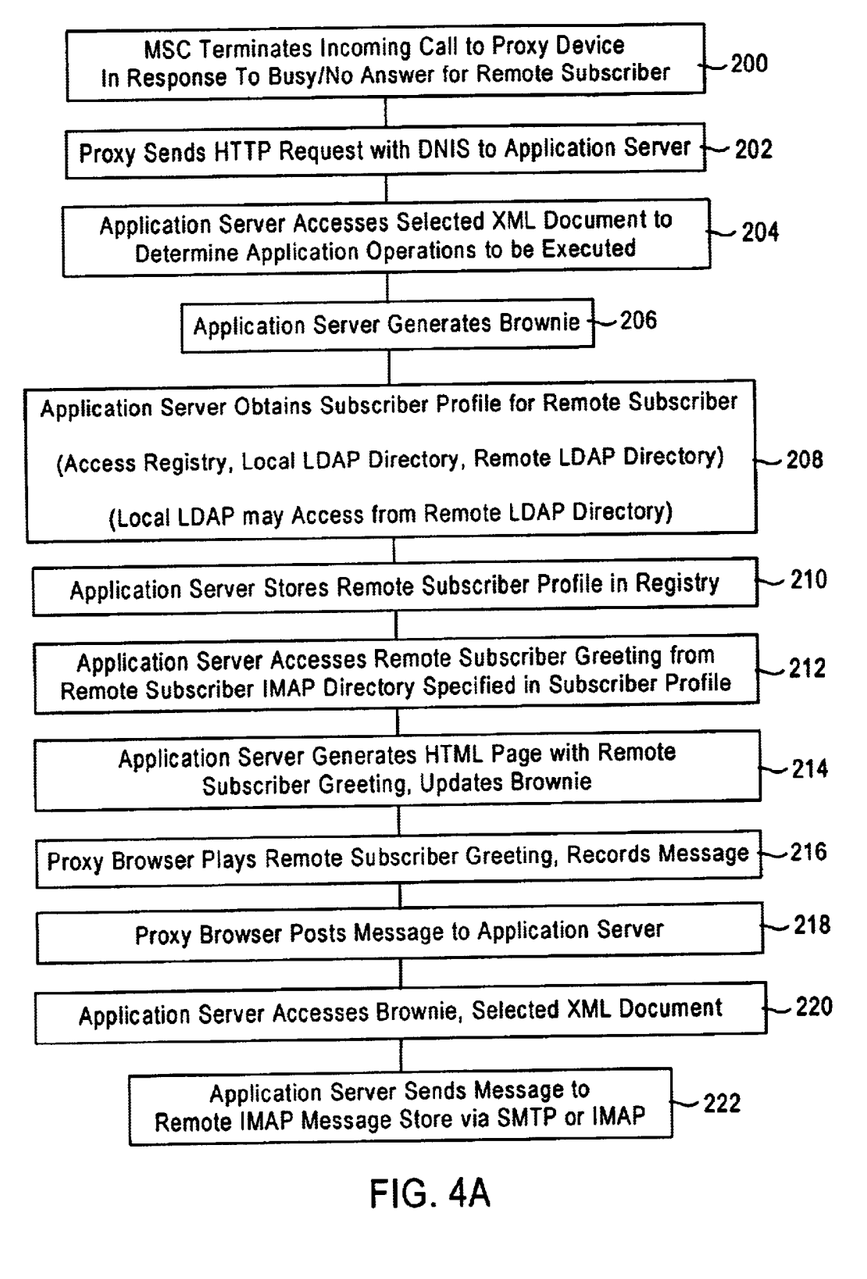
FIGS. 4A and 4B are diagrams illustrating methods by the wireless communication system of FIG. 2 for storing and retrieving messages for a remote wireless subscriber, respectively according to an embodiment of the present invention.
Figure 4B:
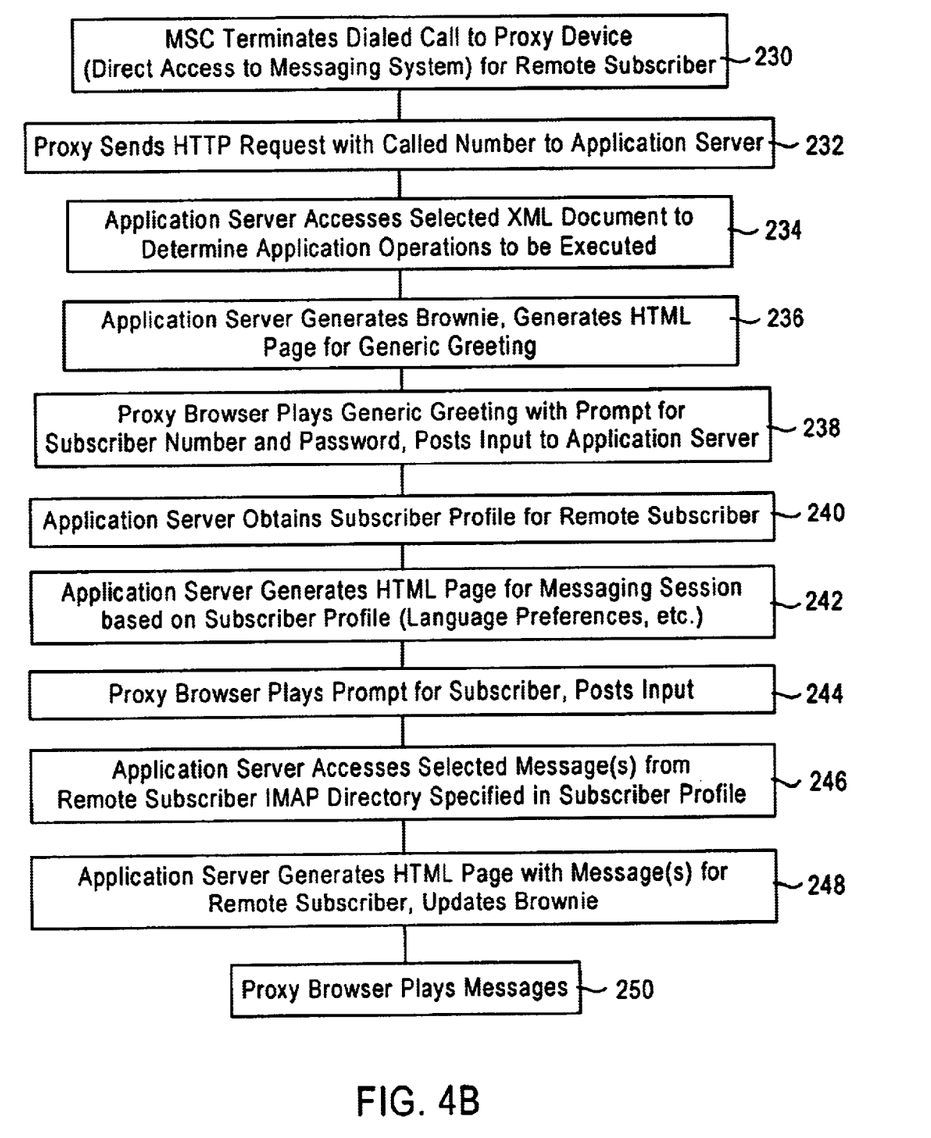

FIGS. 4A and 4B are diagrams illustrating messaging operations executed by the wireless communications system 20 according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disc, etc.).

As shown in FIG. 4A, the method begins by the mobile switching center 24 attempting to terminate an incoming call from the calling party $18d_2$ to the remote (e.g., roaming) wireless subscriber $18d_1$. The mobile switching center 24 terminates in step 200 the incoming call to a proxy device 28 (including the IP gateway 25 and the browser 62) in response to detecting that the roaming wireless subscriber $18d_1$ is unavailable. In response to detecting a connection established by the MSC 24, the proxy browser 62 posts in step 202 an HTTP request for initiation of a session enabling a calling party to leave a message. The proxy browser 62 posts the HTTP request to a prescribed URL that specifies the application server 66a, and includes in the HTTP request the DNIS of the roaming wireless subscriber $18d_1$. The HTTP request may also specify the calling number (ANI), and/or the redirected number (RDNIS), for example the number of the messaging system.

The application server 66a responds to receiving the HTTP request from the proxy browser 62 in step 204 by accessing a selected XML document from the document database 72 based on the command specified in the HTTP request. The application server 66 then generates a new brownie in step 206 that specifies the application state during the application session with the calling party. During subsequent HTTP requests the application server 66a accesses the existing brownie from the registry 92 based on a valid session identifier specified within the HTTP URL request.

The application server 66a then parses the selected XML document, which specifies a function call to the LDAP directory 84 and the IMAP message store 86. In particular, the application server 66a obtains the subscriber profile information for the remote subscriber from the remote subscriber's home LDAP directory (i.e., remote LDAP directory) 88b in step 208. As shown in FIG. 4A, the application server 66a may obtain the subscriber profile information from the remote LDAP directory 88b using different techniques. For example, the application server 66a may first check its local registry 92 to determine whether profile information has already been stored for the roaming subscriber; alternately, the application server 66a may locate the remote LDAP directory 88b based on the DNIS supplied by the proxy browser 62; alternately, the application server 66a may issue a database query to the home LDAP directory 88a, and rely on the home LDAP directory 88a to access the subscriber profile information from the remote LDAP directory 88b.

Once the application server 66a has obtained the subscriber profile information for the remote subscriber in step 208, including the remote subscriber's message mailbox, the application server 66a stores in step 210 the subscriber profile in the local registry 92a, and accesses in step 212 the remote subscriber's personalized greeting from the remote subscriber IMAP message store 86b. The application server 66a then generates in step 214 an HTML page having XML tags that include media content and control data for playback of the remote subscriber's greeting. The application server 66a updates the brownie corresponding to the application session with the calling party, outputs the HTML page to the proxy browser 62, and returns to a restful state. Additional details regarding execution of XML documents by the application server 66 are disclosed in the above-incorporated application 09/480,485.

The proxy browser 62, in response to receiving the HTML page, plays the remote subscriber greeting, plus a prompt for recording a message in step 216. The proxy browser 62 records the message, and posts an HTTP request to the application server 66a that includes the recorded message in step 218. Additional details regarding the operation of the proxy browser 62 are described in commonly assigned, copending application Ser. No. 09/459,927, filed Dec. 14, 1999, entitled "Proxy Browser Providing Voice Enabled Web Application Audio Control for Telephony Devices" (attorney docket 95-408), the disclosure of which is incorporated in its entirety herein by reference.

The application server 66a responds to the HTTP request including the recorded message in step 220 by accessing the brownie for the application session (specified by session ID in the HTTP request), and accessing the selected XML document for execution of the application operation specified by the HTTP request. In particular, the application server 66a selects the XML document related to storing a recorded message, and in response accesses the remote subscriber's destination mailbox address in the IMAP message store 86b from the registry 92a. The application server 66a then sends the recorded message to the remote IMAP message store 86b in step 222.

Hence, the wireless communications system 20a is able to store messages for remote subscribers by using a local application server to locally record the message, and then send the recorded message to a remote message store via the IP network 50. Consequently, callers can leave messages for wireless subscribers without relying on telephony network facilities of the public switched telephone network.

FIG. 4B is a diagram illustrating the retrieval of stored messages from a remote message store 86b by a roaming subscriber $18d_1$ within the wireless communications system 20a according to an embodiment of the present invention. The method begins by the mobile switching center 24 connecting the remote (e.g., roaming) wireless subscriber $18d_1$ in step 230 to the proxy device 28 based on a prescribed direct dial number to the messaging system. The proxy browser 62 posts in step 232 an HTTP request including the called number for initiation of a session enabling a calling party to initiate intelligent calling services with the application server 66a.

The application server 66a responds to receiving the HTTP request from the proxy browser 62 in step 234 by accessing a selected XML document from the document database 72 based on the dialed number included in the HTTP request. The application server 66 then generates a new brownie in step 236 that specifies the application state during the application session with the calling party.

The application server 66a then parses the selected XML document, which specifies validating the calling subscriber using a generic greeting, and generates an HTML page for the generic greeting in step 236. The proxy browser 62 plays the generic greeting in step 238, prompting the calling party for a subscriber number and password; the proxy browser 62 posts the inputs to the application server 66a for validation.

In response to receiving the HTTP request including the input subscriber number and password, the application server 66a in step 240 uses the input subscriber number to obtain the subscriber profile information as described above in detail with respect to step 208 of FIG. 4A.

Once the application server 66a has obtained the subscriber profile information for the remote subscriber in step 240, including the remote subscriber's password and message mailbox, the application server 66a validates the remote subscriber and generates an HTML page for a messaging session based on the subscriber profile in step 242. For example, the default language preference for the application server 66a may be English, however the remote subscriber profile may specify that the language preference for the remote subscriber is Spanish; in such a case, the application server 66a would utilize audible Spanish prompts instead of the default English prompts in step 242.

The proxy browser 62, in response to receiving the HTML page, plays the menu prompts in step 244 for messaging operations to be performed, and posts an HTTP request to the application server 66a that includes the selected option.

The application server 66a responds to the HTTP request including the selected option in step 246 by accessing the brownie for the application session (specified by session ID in the HTTP request), and accessing the selected XML document for execution of the application operation specified by the HTTP request. In particular, the application server 66a selects the XML document related to retrieving stored messages, and in response accesses in step 246 the remote subscriber's destination mailbox address in the IMAP message store 86b from the registry 92a for retrieval of messages via the IP network 50. The application server 66a then generates an HTML page having XML tags that specify the playback of the retrieved message for the remote subscriber, updates the brownie, and returns to a restful state in step 248. The proxy browser 62 then plays the recorded messages for the remote subscriber in step 250.

According to the disclosed embodiment, wireless calls for voice mail systems are terminated at the nearest wireless point of presence, and translated into an XML voice enabled Web application session, enabling the transfer of application services across an IP network. Application services can be ported to different application servers based on remote access of subscriber profile information and subscriber message stores. Hence, unified messaging systems can utilize the IP network for transport of messages, and sharing of application infrastructure with PCs, browser web applications, and e-mail applications. Moreover, the retrieval of subscriber profile information from remote profile directories enables deployment of a mobile Internet for roaming PCs, global telephones, e-mail applications, etc. Hence, any device accessing a local server can obtain full application services based on the local server accessing the remote subscriber profile information for that device, regardless of whether the application services are for messaging applications, two-way instant messaging or real-time voice over IP phone calls using a PC, etc. In addition, the retrieval of subscriber profile information enables notification systems to follow the subscriber, providing further mobility for notification-based application services.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a wireless communications system of retrieving a stored message for a roaming wireless subscriber, the method including:

terminating by a mobile switching center an incoming wireless telephone call from the roaming wireless subscriber to a proxy device configured for generating HTTP requests and playback of media content based on selective execution of tagged information within web pages;

initiating by the proxy device a messaging application session executed by an application server for the roaming wireless subscriber, the application server configured for generating the web pages based on the respective HTTP requests, at least one of the HTTP requests specifying the wireless subscriber;

obtaining by the application server subscriber attribute information related to the roaming wireless subscriber from an Internet Protocol (IP) based database server via an IP network;

obtaining, by the application server, the stored message via the IP network from an IP-based messaging server based on a prescribed address retrieved from the obtained subscriber attribute information; and generating by the application server a web page including tags for playback of the stored message to the roaming wireless subscriber by the proxy device.

2. The method of claim 1, wherein the generating step includes adding media tags within the web page that specify prescribed audible prompts based on language preferences specified in the subscriber attribute information.

3. The method of claim 1, with further comprising storing the subscriber attribute information in a local registry for use by the application server during the messaging application session with the roaming wireless subscriber.

4. The method of claim 1, wherein the generating step includes outputting the web page to the proxy device based on validating the roaming wireless subscriber relative to a password supplied by the proxy device and a stored password within the subscriber attribute information.

5. The method of claim 1, wherein the step of obtaining the subscriber attribute information includes accessing the IP based database server according to LDAP protocol.

6. The method of claim 1, wherein the step of obtaining the stored message includes accessing the IP-based messaging server according to IMAP protocol.

7. A computer readable medium having stored thereon sequences of instructions for retrieving a stored message for a roaming wireless subscriber, the sequences of instructions including instructions for performing the steps of:

terminating by a mobile switching center an incoming wireless telephone call from the roaming wireless subscriber to a proxy device configured for generating HTTP requests and playback of media content based on selective execution of tagged information within web pages;

initiating by the proxy device a messaging application session executed by an application server for the roaming wireless subscriber, the application server configured for generating the web pages based on the respective HTTP requests, at least one of the HTTP requests specifying the wireless subscriber;

obtaining by the application server subscriber attribute information related to the roaming wireless subscriber from an Internet Protocol (IP) based database server via an IP network;

obtaining, by the application server, the stored message via the IP network from an IP-based messaging server based on a prescribed address retrieved from the obtained subscriber attribute information; and generating by the application server a web page including tags for playback of the stored message to the roaming wireless subscriber by the proxy device.

8. The medium of claim 7, wherein the generating step includes adding media tags within the Web page that specify prescribed audible prompts based on language preferences specified in the subscriber attribute information.

9. The medium of claim 7, with further comprising instructions for performing the step of storing the subscriber attribute information in a local registry for use by the application server during the messaging application session with the roaming wireless subscriber.

10. The medium of claim 7, wherein the generating step includes outputting the web page to the proxy device based on validating the roaming wireless subscriber relative to a password supplied by the proxy device and a stored password within the subscriber attribute information.

11. The medium of claim 7, wherein the step of obtaining the subscriber attribute information includes accessing the IP based database server according to LDAP protocol.

12. The medium of claim 7, wherein the step of obtaining the stored message includes accessing the IP-based messaging server according to IMAP protocol.

* * * * *